US007523187B1

(12) United States Patent  
Lavallee et al.

(10) Patent No.: US 7,523,187 B1
(45) Date of Patent: Apr. 21, 2009

(54) METHODS AND APPARATUS FOR MANAGING NETWORK RESOURCES

(75) Inventors: James E. Lavallee, Boylston, MA (US); Francois Gauvin, Salem, MA (US); Hanna Yehuda, Newton, MA (US); Kassem Al-Sayed Ali, Boston, MA (US); Anita M. Stout, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 911 days.

(21) Appl. No.: 10/814,117

(22) Filed: Mar. 31, 2004

(51) Int. Cl.
*G06F 15/173* (2006.01)
(52) U.S. Cl. ...................... 709/223; 709/220
(58) Field of Classification Search .......... 709/220, 709/221, 222, 224, 225, 226, 227, 228, 229; 370/389
See application file for complete search history.

(56) References Cited

U.S. PATENT DOCUMENTS 6,920,494 B2 * 7/2005 Heitman et al. ............. 709/223

2003/0189929 A1 * 10/2003 Matsuzaki et al. .......... 370/389
2004/0215749 A1 * 10/2004 Tsao .......................... 709/220

\* cited by examiner

*Primary Examiner*—Ario Etienne
*Assistant Examiner*—Marshall McLeod
(74) *Attorney, Agent, or Firm*—Barry W. Chapin, Esq.; Chapin IP Law, LLC

(57) ABSTRACT

A processing device displays a physical network topology associated with a storage area network on a display screen. The physical network topology generated by the processing device includes identification of at least one switch resource that supports connectivity among resources in a corresponding storage area network. The processing device typically receives input from a user to display at least one virtual network associated with the storage area network. In response to receiving the input, the processing device displays a virtual network topology associated with the selected at least one virtual network in relation to the physical network topology on the display screen. Displaying the virtual network topology in relation to the physically network topology provides a unique view for the network manager to identify network resources in physical fabric associated with a selected virtual storage area network.

37 Claims, 9 Drawing Sheets

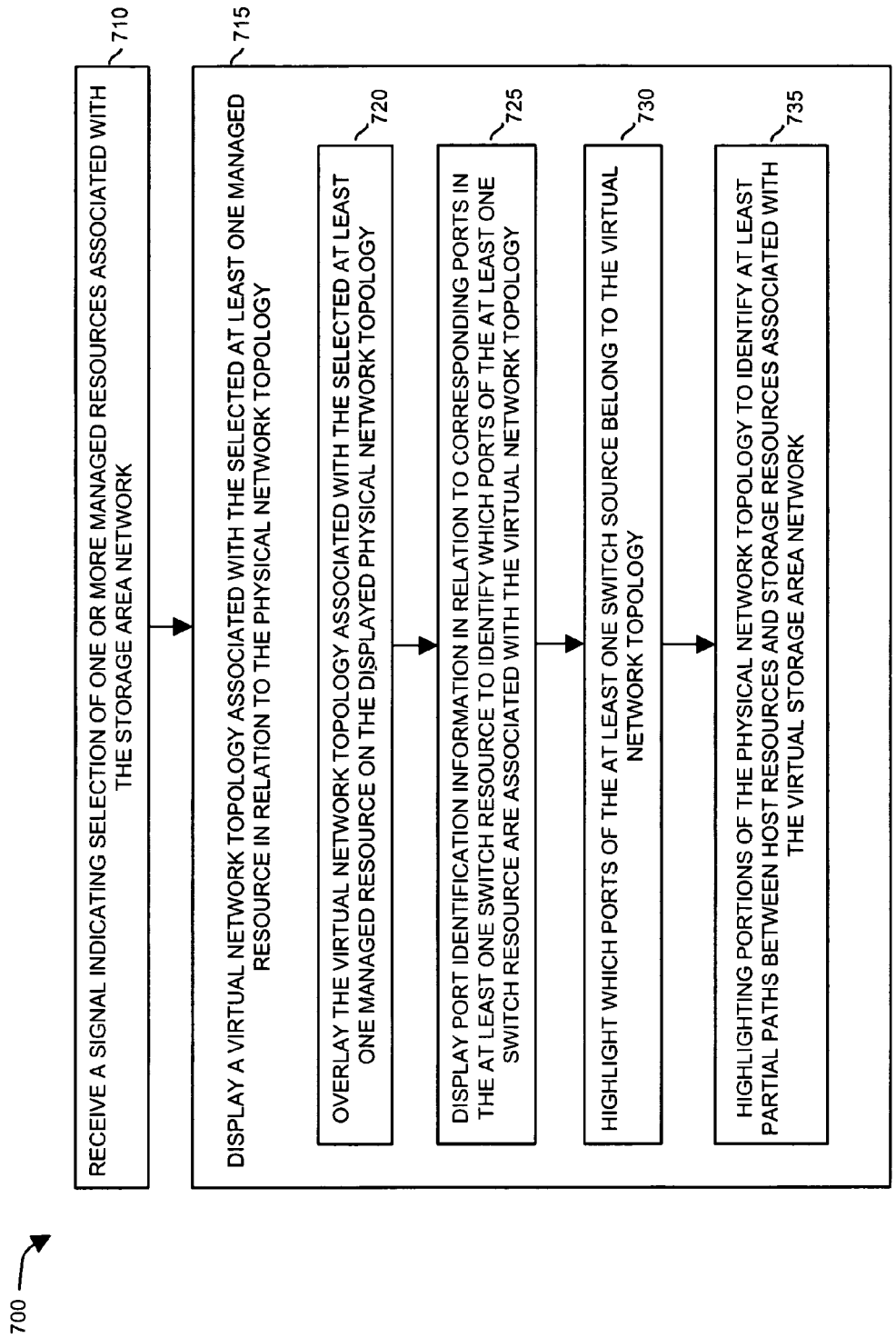

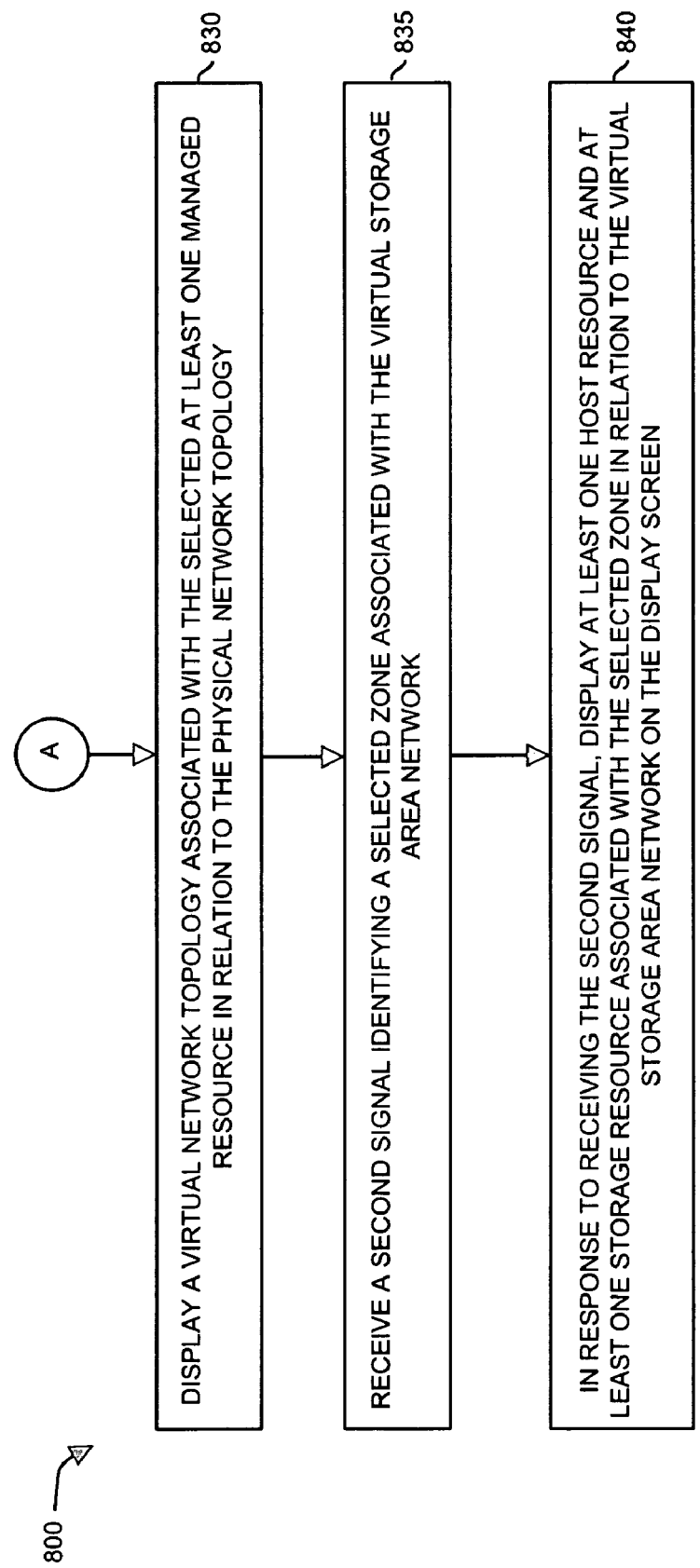

METHODS AND APPARATUS FOR MANAGING NETWORK RESOURCES

BACKGROUND

The rapid expansion of information service and data processing industries has resulted in a need for computer systems to manage and store large amounts of data. As an example, financial service companies such as banks, mutual fund companies or the like often operate complex data processing systems that require access to many hundreds of gigabytes or even terabytes of data and files stored within high capacity data storage systems. Data storage system developers have responded to these types of data storage requirements by integrating large capacity data storage systems, data communications devices and computer systems into networks called "storage networks" or "storage area networks" (SANs). A storage area network is a collection of data storage systems that are networked with a number of host computer systems that operate as servers to access data stored in the data storage systems on behalf of client computers that request data from the servers.

Conventional storage area network management applications provide conventional graphical user interfaces (GUIs) that enable network managers to graphically manage, control and configure various types of hardware and software resources associated with a corresponding managed storage area network. For example, one conventional network management storage application generates a graphical user interface utilized by a network manager to graphically select, interact with, and manage local of remote devices and associated software processes associated with the storage area network. More specifically, based on use of the graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. Typically, in such network management applications, the network manager selects a displayed icon representing a corresponding managed resource in the network and applies management commands to carry out intended management functions.

As noted above, a storage area network may include a number of hardware devices such as host computers, servers, data communications devices (e.g., switches, routers, etc.), network attached storage devices, proxy devices, firewall devices, and so forth that are coupled amongst each other via physical cables. Certain conventional network management applications are designed to provide a network manager with information concerning how these network resources are interrelated. For example, certain network management applications enable a network manager to configure resources in the network to form virtual storage area networks (VSANs).

VSAN technology enables a network manager to define independent logical fabrics in a storage area network based on sets of one or more physical switches. For example, physical storage area network switches in the storage area network, such as those manufactured by Cisco Systems, Inc. of San Jose, Calif., USA and other vendors, provide a coupling between host computer systems and corresponding storage systems. The hosts and storage systems couple to switch ports of the physical switches. Based on routing or switching of data in the physical switches, hosts are able to communicate through switch ports of the physical switches to corresponding storage systems and vice versa.

A storage area network administrator (i.e., a person) can operate conventional switch management and configuration software to create a VSAN within the switch that inter-relates or associates a selected set of switch ports coupling certain hosts or certain storage systems in order to isolate those inter-related switch ports (and hence their respectively connected hosts and storage systems) from other components (i.e., other host and storage systems) operating in the storage area network. In other words, a VSAN is a grouping of switch ports that represents a logical storage area network. From the perspective of a physical switch device, each given switch port (in a physical switch) is assigned to only one VSAN. Each VSAN may include two or more switch ports to couple host resources to corresponding storage resources of the storage area network. Thus, each VSAN is completely isolated from the other VSANs and functions as a separate and independent storage area network fabric with its own set of fabric services such as name services, zoning, routing, and so on.

SUMMARY

Conventional network management applications that support management of network resources such as VSANs suffer from a variety of deficiencies. For example, certain conventional network management applications enable a network manager to display a table identifying specific ports in a switch device associated with a corresponding VSAN. However, providing only a table identifying switch ports in a VSAN complicates a job associated with management of a large storage area network because it can be difficult for the network manager to visualize a VSAN without seeing a pictorial representation of the VSAN on a display screen. Furthermore, it can be difficult for the network manager to distinguish one VSAN from another VSAN based on merely viewing contents in a table. Thus, such conventional VSAN management and switch configuration applications do not provide a useful view of VSANs in a corresponding storage area network.

Conventional network management applications also enable a network manager to display certain associations among network resources in a storage area network. However, such conventional network management applications do not enable a network manager to quickly and efficiently view and graphically identify network resources associated with a particular VSAN in relation to each other, and in relation to resources not contained in a VSAN.

Embodiments of the invention significantly overcome the aforementioned and other deficiencies of conventional network management applications. In particular, embodiments of the invention include mechanisms and techniques for managing network resources via use of a graphical user interface rendered on a computer display. In one embodiment, the display enables a user such as a network manager to view a virtual storage area network topology, representing one or more VSAN, overlayed on a physical network fabric topology of a storage area network. The computer device generating the virtual storage area network topology may be, for example, a network management workstation including a network management software application (e.g., a resource manager) that presents, during runtime, a graphical user interface to a corresponding network manager. Typically, a network manager provides input to the graphical user interface to perform different management operations such as viewing VSANs in the physical network fabric. Certain embodiments of the invention extend to network management software incorporating the functionality explained herein, as well as computerized devices configured to operate as explained herein.

Embodiments of the invention thus allow a network manager to view those storage area network components configured within a VSAN in a graphical format in relation to one another and in relation to non-VSAN components in the storage area network. The VSAN components can be displayed in a graphical topology view and can include host resources (e.g. host computer, host adapters, and host adapter ports), switch resources (switches and switch ports) and storage device (i.e., storage system or storage array) resources (storage systems, storage adapters and storage adapter ports). This VSAN view can be overlayed visually "on top of" a topology view of the storage area network such that those storage area network components that are in and that are not in the VSAN are readily discernable. Embodiments of the invention further allow a network administrator to select, for example, multiple VSANs. In response to receiving a selection of multiple VSANs, a GUI according to an embodiment of the invention displays a topology view of the selected VSANs with the storage area network in a graphical manner so as to visually identify those storage area network resources associated with each VSAN (e.g., via color highlighting techniques).

More specifically, an embodiment of the invention includes a network management software applications (running on a network management computer station) that enables a network manager to view one or more VSANs associated with a storage area network. The network manager selects from a hierarchy of icons to identify which VSAN (or VSANs) to display on a display screen. In response to selection by the network manager, the network management software application displays a physical fabric (e.g., switch resources coupling host resources to corresponding storage resources) on a display screen as well as corresponding configuration information associated with one or more selected VSANs. For example, in one embodiment, the network management software application displays a topology of the selected one or more VSANs over the physical fabric. Thus, the network management software application provides the network manager with a topology view including a subset of resources in the storage area network associated with the selected one or more VSANs. In a further embodiment, the network management software application provides a topology view including specifically identified switch ports associated with the selected VSAN. In yet further embodiments, the network management software application identifies host resources and storage resources associated with the one or more selected VSANs.

More general embodiments of the invention include a technique of utilizing a processing device to display a physical network topology associated with a storage area network on a display screen. The physical network topology generated by the processing device includes identification of at least one switch resource that supports connectivity among resources in a corresponding storage area network. The processing device receives input from a user to display at least one virtual network associated with the storage area network. In response to receiving the input, the processing device displays a virtual network topology associated with the selected at least one virtual network in relation to the physical network topology on the display screen. Displaying the virtual network topology in relation to the physically displayed network topology of the storage area network enables a network manager to identify network resources in physical fabric associated with a selected virtual storage area network.

In further overlapping embodiments and potentially other independent embodiments of the invention, the processing device receives a signal indicating selection of one or more managed resources associated with the storage area network. For example, the processing device receives a signal (initiated by a user) identifying a selected one or more virtual storage area network for viewing on a display screen. In response to receiving the signal, the processing device extracts configuration information from a database to identify an overall physical network topology associated with the storage area network. Additionally, the processing device extracts configuration information from the database to identify network resources associated with the one or more virtual storage area networks selected by a user for display.

Based on the configuration information extracted from the database, the processing device displays the selected one or more virtual network topology associated with the selected at least one managed resource in relation to the physical network topology on the display screen. More specifically, in one embodiment, the processing device overlays the virtual network topology (including the one or more VSANs selected by a user) on the displayed physical network topology. Overlaying the virtual network topology in relation to the physically network topology of the storage area network enables a network manager to identify a subset of network resources in the storage area network associated with the one or more selected VSANs.

Presentation of information associated with the virtual storage area network topology (e.g., including one or more VSANs) varies depending on the application. For example, in one embodiment, the processing device display port identification information (e.g., slot and port numbers of a corresponding switch device supporting the VSANs) in relation to corresponding icons representing switch ports on the display screen. Thus, the processing device displays information to identify which communication ports of a switch resource are associated with corresponding VSANs displayed in the virtual storage area network topology.

In a further embodiment, the processing displays uniquely identified switch ports associated with switch resources of the physical network topology. To identify network resources associated with the virtual storage area network topology, the processing device highlights (e.g., underlines, shades, marks, etc.) which uniquely identified switch ports of the at least one switch resource belong to a particular VSAN. Different colors or markings may be used to distinguish elements of two or more VSANs simultaneously displayed in the virtual network topology overlayed on the physical network topology. For example, network resources associated with a first VSAN may be shaded with a first color while network resources associated with a second VSAN may be shaded with a second color.

The virtual network topology may be extended to include additional network resources associated with the displayed one or more VSAN. For example, in one embodiment, the processing device highlights portions of the physical network topology to identify at least partial paths between host resources (e.g., ports, adapters, hosts, clients, etc., associated with a host computer) and storage resources (e.g., ports, adapters, storage devices, storage array, etc., associated with a storage system) associated with the displayed VSANs of the virtual storage area network. Thus, a network manager can identify which network resources (e.g., clients, target storage devices, etc.), in addition to those in a switch device, are associated with a particular VSAN.

In one embodiment of the invention, the processing device displays a vertically disposed hierarchy of multiple icons representing corresponding managed resources associated with the storage area network. In relation to the hierarchy of multiple icons, the processing device maintains corresponding display regions to receive input commands from a user making a corresponding selection of the at least one managed resource. For example, the display regions enable a user to make a selection of at least one of the multiple icons to select the one or more managed resources (e.g., virtual storage area networks) associated with the storage area network.

The user then initiates activation of the selection by clicking on an icon of the display screen. In turn, the processing device receives a signal indicating selection of one or more managed resources (such as a virtual storage area network) associated with the storage area network. In response to the selected one or more managed resource, the processing device displays a physical network topology associated with the storage area network on a display screen. The physical network topology includes identification of at least one switch resource that supports connectivity among host resources and storage resources in the storage area network. In addition to displaying the physical network topology, the processing device displays (e.g., overlays) a virtual network topology associated with the selected at least one managed resource in relation to the physical network topology.

The processing device enables a user to make a further selection for displaying additional managed resources associated with the storage area network. For example, a user may select a zone associated with a displayed VSAN from the hierarchy of icons. In response to a user's selection of a particular zone, the processing device receives a signal identifying a selected zone associated with the virtual storage area network. In response to receiving the signal identifying selection of the zone, the processing device displays at least one host resource and at least one storage resource associated with the selected zone in relation to the virtual storage area network on the display screen.

As discussed, techniques of the invention are well suited for use in applications in which a network manager manages a storage area network including one or more VSANs. However, it should be noted that embodiments of the invention are not limited to use in such applications and thus embodiments of the invention are well suited for other applications as well.

Other embodiments of the invention include a computerized device (e.g., a host computer, workstation, etc.) configured to support the aforementioned method operations disclosed herein as embodiments of the invention to provide a VSAN topology view. In such embodiments, the computerized device includes a display, a memory system, a processor (e.g., a processing device) and an interconnect. The interconnect supports communications among the display, the processor and the memory system. The memory system is encoded with a resource management application that, when executed on the processor, produces a resource management process that includes a graphical user interface produced on the display of the computerized device. The graphical user interface allows the resource management process to perform any of the method embodiments and operations explained herein.

Yet other embodiments of the invention disclosed herein include software programs to perform the method embodiment and operations summarized above and disclosed in detail below under the heading Detailed Description of Preferred Embodiments. More particularly, a computer program product (e.g., a computer-readable medium) including computer program logic encoded thereon may be executed on a computerized device to support generation and display of relationship views and associated operations as explained herein. The computer program logic, when executed on at least one processor with a computing system, cause the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

One more particular embodiment of the invention is directed to a computer program product that includes a computer readable medium having instructions stored thereon for supporting management of network resources. The instructions, when carried out by a processor of the first data communication device, cause the processor to perform the steps of: i) displaying a physical network topology associated with the storage area network on a display screen, the physical network topology including identification of at least one switch resource that supports connectivity among host resources and storage resources in the storage area network, ii) receiving a signal indicating a selected at least one managed resource associated with the storage area network, and iii) displaying a virtual network topology associated with the selected at least one managed resource in relation to the physical network topology. Other embodiments of the invention include software programs to perform any of the method embodiment steps and operations summarized above and disclosed in detail below.

It should be understood that the system of the invention can be embodied as a software program or as a software program operating in conjunction with corresponding hardware. Example embodiments of the invention may be implemented within EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 7 is a flowchart illustrating another technique for managing network resources according to an embodiment of the invention.

FIGS. 8A and 8B combine to form a flowchart illustrating a more detailed technique for managing network resources according to an embodiment of the invention.

DETAILED DESCRIPTION OF PREFERRED EMBODIMENTS

An embodiment of the invention includes a network management software application (e.g., running on a network management computer station) enabling a network manager to view one or more VSANs associated with a storage area network. The network manager selects from a hierarchy of icons which VSAN (or VSANs) to display on a display screen. In response to selection by the network manager, the network management software application displays a physical fabric (e.g., switch resources coupling host resources to corresponding storage resources) on a display screen as well as corresponding configuration information associated with one or more selected VSANs. In one embodiment, the network management software application displays a topology of the selected one or more VSANs over the physical fabric. Thus, the network management software application provides the network manager with a topology view including a subset of resources in the storage area network associated with the selected one or more VSANs. In a further embodiment, the network management software application provides a topology view including specifically identified switch ports associated with the selected VSAN. In yet further embodiments, the network management software application identifies host resources and storage resources associated with the one or more selected VSANs.

Figure 1:
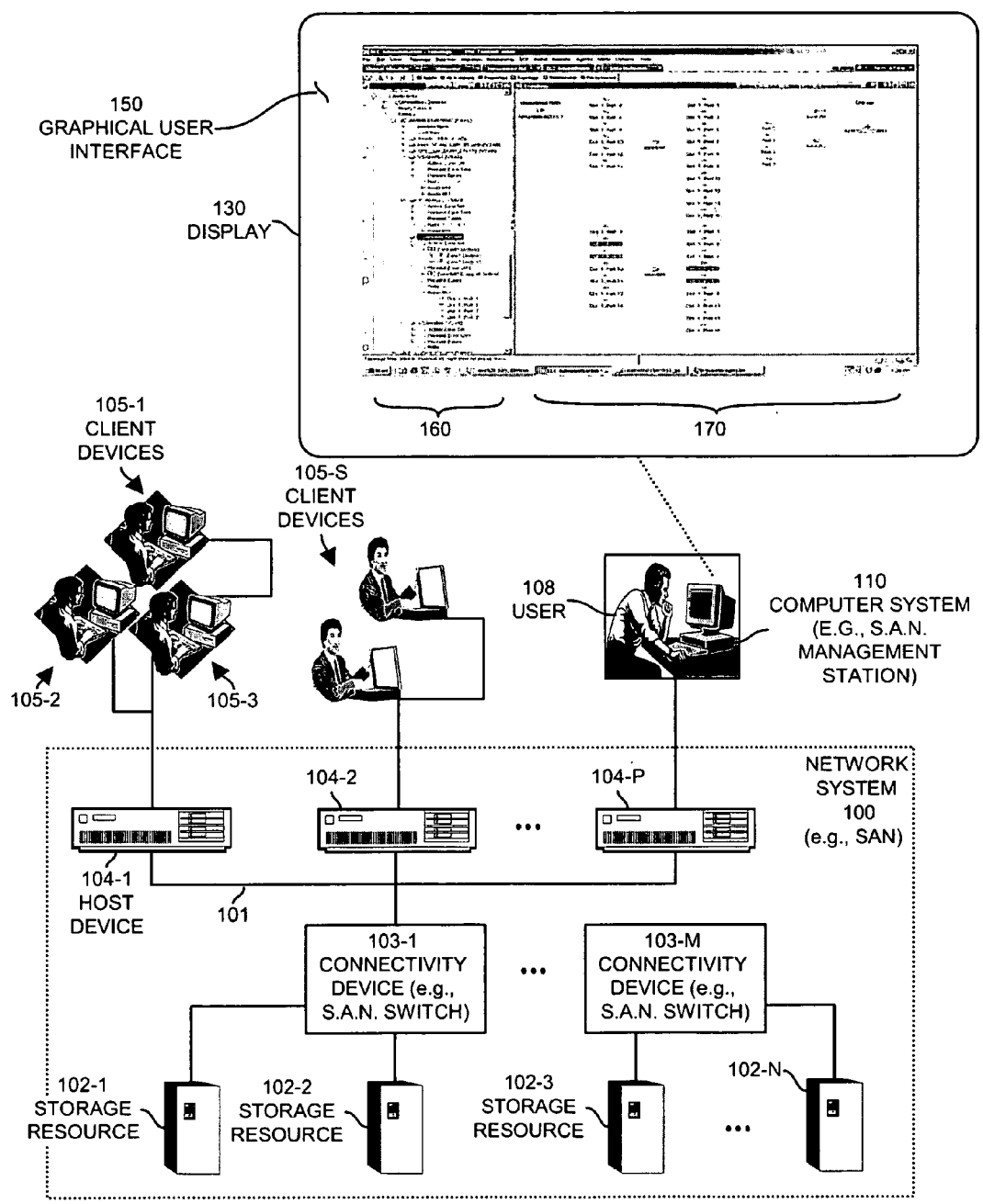
FIG. 1 is a block diagram of a storage area network and management station configured to operate according to an embodiment of the invention.

FIG. 1 illustrates a network system 100 (e.g., a storage area network) suitable for use in explaining an operation of example embodiments of the invention. As shown, the network system 100 includes a network medium 101 such as a high-speed data communications medium (e.g., Ethernet, optical network, or other type of network) that interconnects a plurality of components such as storage resources 102-1, 102-2, . . . 102-N, storage area network switches 103-1, . . . , 103-M, host devices (e.g., host servers) 104-1, 104-2, . . . , 104-P, client devices 105-1, 105-2, . . . , 105-S, and computer system 110 (e.g., a storage area network management station).

Computer system 110 is configured, in this example, as a storage area network management station operated by network manager or user 108 (e.g., a user responsible for managing the resources within the storage area network 100). Computer system 110 executes a resource manager application 120 (e.g., a software graphical user interface application more particularly shown in FIG. 2) that generates and displays information in accordance with embodiments of the invention as will be explained herein. The resource manager 120 in this example may be any type of network management software application that executes, performs or otherwise operates within the management station computerized system 110. It should be noted that computer system 110 may include certain other components such as one or more internal devices as well as software applications or processes that operate within or in conjunction with the illustrated components and devices in FIG. 1.

As shown towards the top of FIG. 1, the management station computer system 110 (e.g., a computer device) includes a corresponding display 130 (e.g., a monitor or other visual display device) which resource manager 120 controls to display a graphical user interface 150 as explained herein. User 108 provides input commands to control what information (e.g., tables, pop-up screens, etc.) is displayed on display 130.

The graphical user interface 150 configured in accordance with embodiments of the invention includes a hierarchical arrangement of icons 160 (e.g., a hierarchy of vertically disposed icons) and display region 170. Display region 170 includes configuration information (e.g., VSANs, zones, etc.) associated with network system 100. Icons illustrated on display 130 represent managed hardware and software entities associated with network 100. As will be explained in more detail shortly, the graphical user interface 150 enables a user 108 of the computer system 110 to select one or more icons (e.g., host resources) from the hierarchical arrangement of icons 160 displayed on the left side of display 130 and display configuration information including elements or resources associated with a selected VSAN in display region 170.

Figure 2:
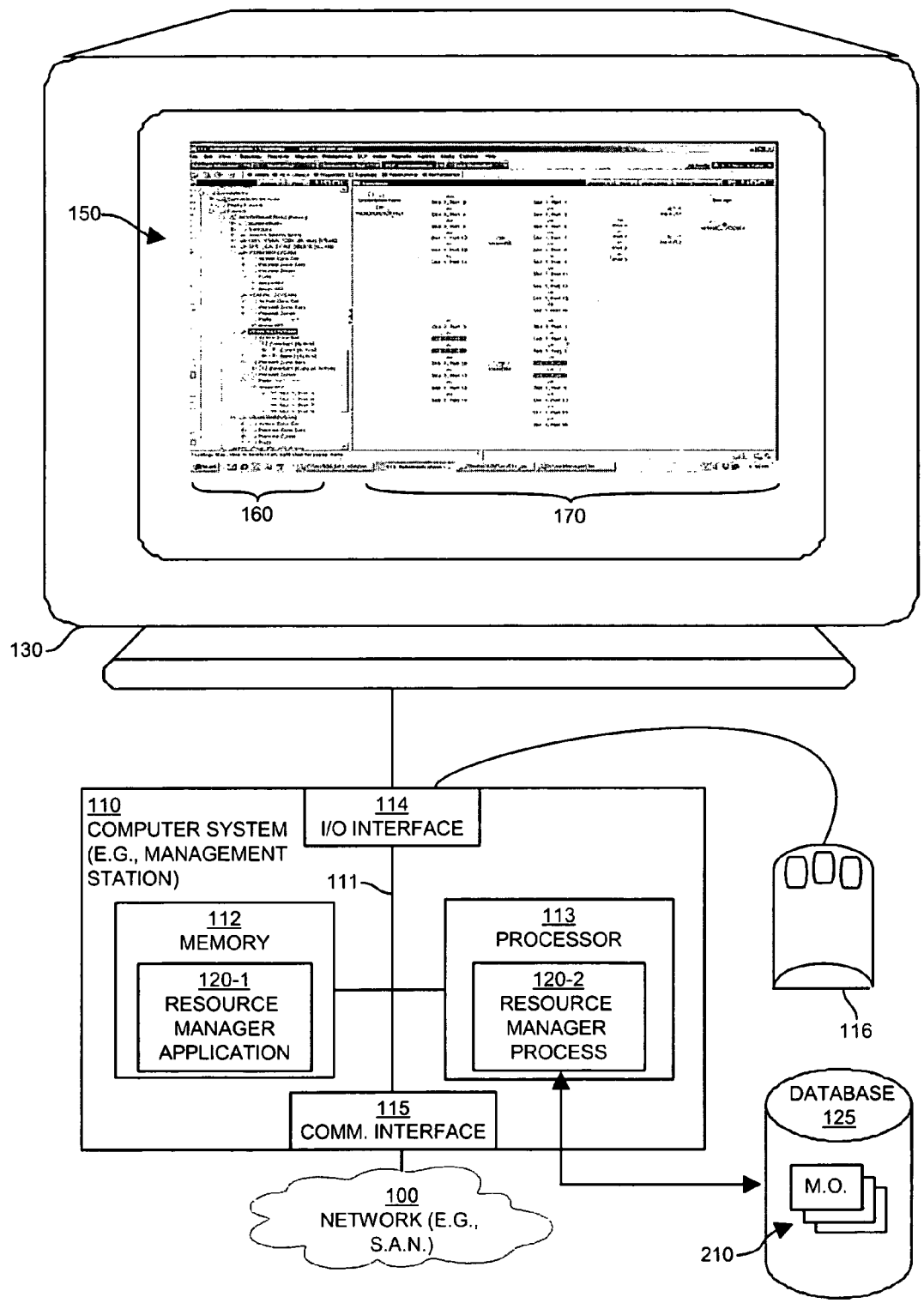
FIG. 2 is a block diagram of a processing device suited for executing techniques according to an embodiment of the invention.

FIG. 2 is a block diagram illustrating an example architecture of computer system 110 (e.g., a storage area network management station) according to embodiments of the invention. Computer system 110 may be a computerized device such as a personal computer, workstation, portable computing device, console, network terminal or the like. As shown, computer system 110 of the present example includes an interconnect 111 that couples a memory 112, a processor 113, an input/output interface 114 and a communications interface 115. Peripheral device 116 (e.g., one or more viewer controlled devices such as a keyboard, mouse, etc.) couples to processor 113 through I/O interface 114 and enables user 108 to provide input commands and thus generally control display management functions associated with graphical user interface 150. Database 125 stores managed objects 210 associated with managed entities (e.g., hardware and software entities associated with host devices 104, storage resources 102, etc.) in network system 100. Communications interface 115 enables computer system 110 (and corresponding user 108) to communicate with other devices (i.e., resources) associated with network 100.

As shown, memory 112 is encodes with resource manager application 120-1 supporting generation, display, and implementation of functional operations of graphical user interface 150. Resource manager application 120-1 may be embodied as software code such as data and/or logic instructions (e.g., code stored in the memory or on another computer readable medium such as a disk) that supports processing functionality according to different embodiments of the invention as described herein. During operation, processor 113 accesses memory 112 via the interconnect 111 in order to launch, run, execute, interpret or otherwise perform the logic instructions of the resource manager application 120-1. Execution of resource manager application 120-1 produces processing functionality in resource manager process 102-2. In other words, the resource manager process 120-2 represents one or more portions of the resource manager application 120-1 (or the entire application 120-1) performing within or upon the processor 113 in the computerized device 110.

It should be noted that the resource manager 120 executed in computer system 110 is represented in FIG. 2 by either one or both of the resource manager application 120-1 and/or the resource manager process 120-2. For purposes of the discussion of the operation of embodiments of the invention, general reference will be made to the resource manager 120 as performing the various steps and functional operations to carry out the features of embodiments of the invention.

It should also be noted that embodiments of the invention include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory type system such as in firmware, read only memory (ROM), or, as in this example, as executable code within the memory system 112 (e.g., within Random Access Memory or RAM). In addition to these embodiments, it should also be noted that other embodiments of the invention include the execution of resource manager application 120-1 in processor 113 as the resource manager process 120-2. Thus, those skilled in the art will understand that the computer system 110 may include other processes and/or software and hardware components, such as an operating system that controls allocation and use of hardware resources.

Display 130 need not be coupled directly to computer system 100. For example, the resource manager 120 can be executed on a remotely accessible computerized device. In this instance, the graphical user interface 150 may be displayed locally to the user, while the resource manager process 120 is executed remotely.

To generate displayed information in graphical user interface 150, the host computer system 110 (e.g., the resource manager process 120-2) extracts information from managed objects 210 stored in database 125. For example, in one embodiment, the resource manager 120 receives an identity of at least one selected network resource (e.g., VSAN) associated with the storage area network. Based on the selected network resource, the resource manager 120 extracts information associated with the managed objects 210 associated with the selected network resource as well as other related managed objects 210 from management database 125.

As mentioned, graphical user interface 150 generated by resource manager 120 provides user 108 an ability to display topology of VSANs and related network resources (e.g., clients, storage devices, etc.). For example, based on processing of retrieved information from database 125, the resource manager 120 displays a topology of the selected one or more VSANs over a physical network fabric. Thus, the network management software application can provide the network manager with a virtual network topology view including a subset of resources in the storage area network associated with a selected one or more VSANs.

In one embodiment, computer system 100 extracts information from database 125 using SQL (Structured Query Language) and stores the information in data structures for processing. For example, database 125 contains managed objects 210 (e.g., database records, tables, data structures, etc.) associated with various hardware and software entities associated with network system 100. In one embodiment, database 125 includes managed objects 210 corresponding to network resources in network system 100. More details regarding user of managed objects 210 will be discussed in connection with FIG. 3.

Figure 3:
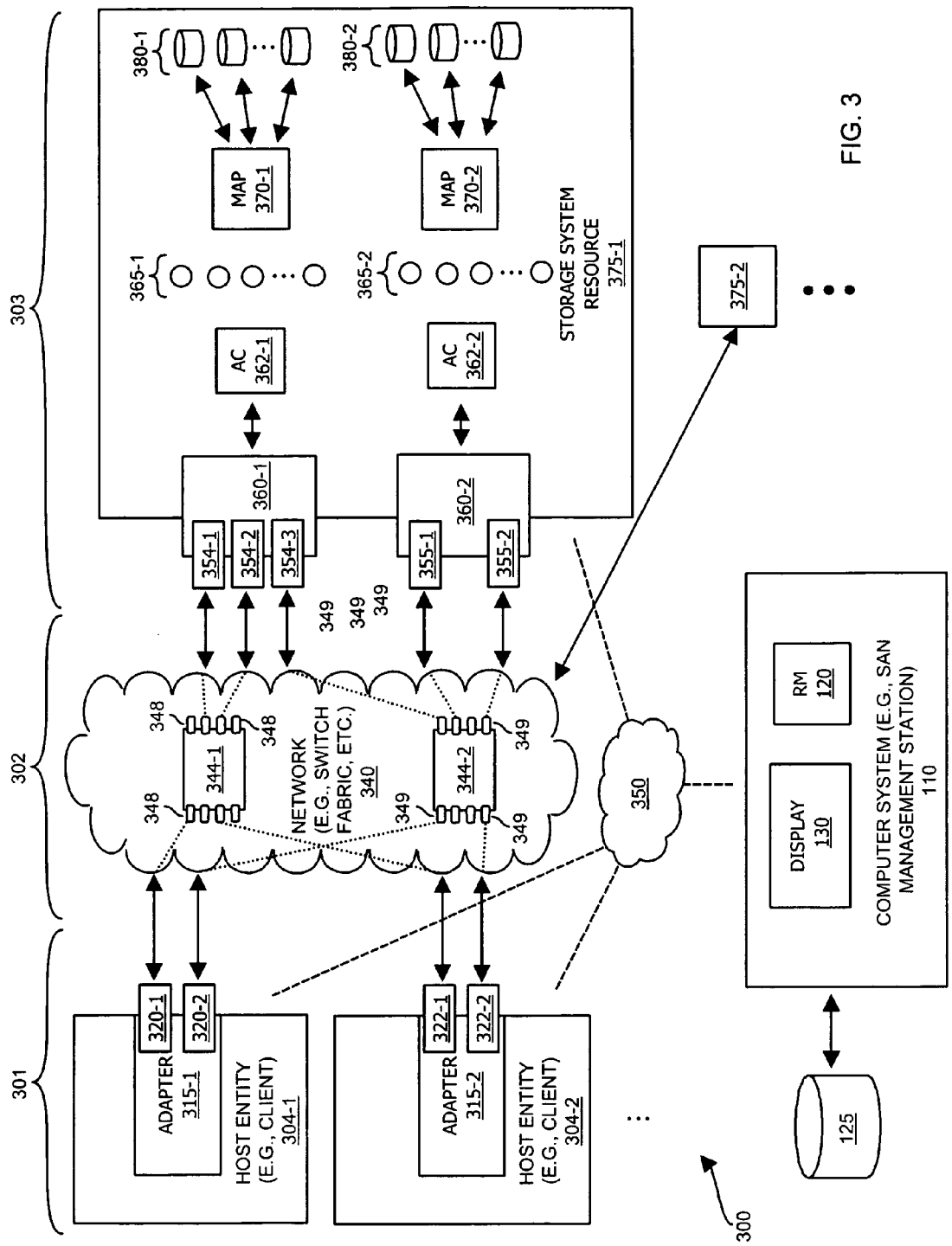
FIG. 3 is a block diagram illustrating a relationship between host resources, switch resources, and storage resources according to an embodiment of the invention.

FIG. 3 is a block diagram illustrating connectivity of network resources (e.g., host resources 301, switch resources 302, and storage resources 303) in a storage area network 300 according to an embodiment of the invention. As shown, storage area network 300 includes host entity 304-1 and host entity 304-2 (collectively, host entities 304), network 340 (e.g., a high speed fiber based switch fabric), network 350 (e.g., LAN, WAN, Internet, intranet, etc.), storage system resource 375-1, storage system resource 375-2, computer system 110, and database 125. Network 340 includes switch device 344-1, switch device 344-2 and corresponding switch ports 348 and 349. Host entity 304-1 includes adapter 315-1 and corresponding port 320-1 and port 320-2 to communicate over network 340. Similarly, host entity 304-2 includes adapter 315-2 and corresponding port 322-1 and port 322-2 to communicate over network 340. Storage system resource 355-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, storage area network 300 enables host entities 304 (e.g., clients, host computes, etc.) to access storage system resources 375. For example, host entity 304-1 couples to network 340 via adapter 315-1 and corresponding ports 320. Ports 320 couple to respective ports 348 and 349 on switch devices 344. In turn, ports 348 and 349 of switch devices 344 couple to ports 354 and 355 of corresponding storage system resources 375. Thus, switch devices 344 and corresponding ports 348 and 349 form at least part of a connection path between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380.

Each host entity 304 is limited to accessing certain storage devices 365 in storage system resource 375-1 based at least in part on configuration settings of switch devices 344 of network 340. In one embodiment, each of switch ports 348 and 349 are assigned to support a particular VSAN in network 340. Host entities 304 associated with the particular VSAN access storage system resources 375 via routing through switch devices 344.

Figure 4:
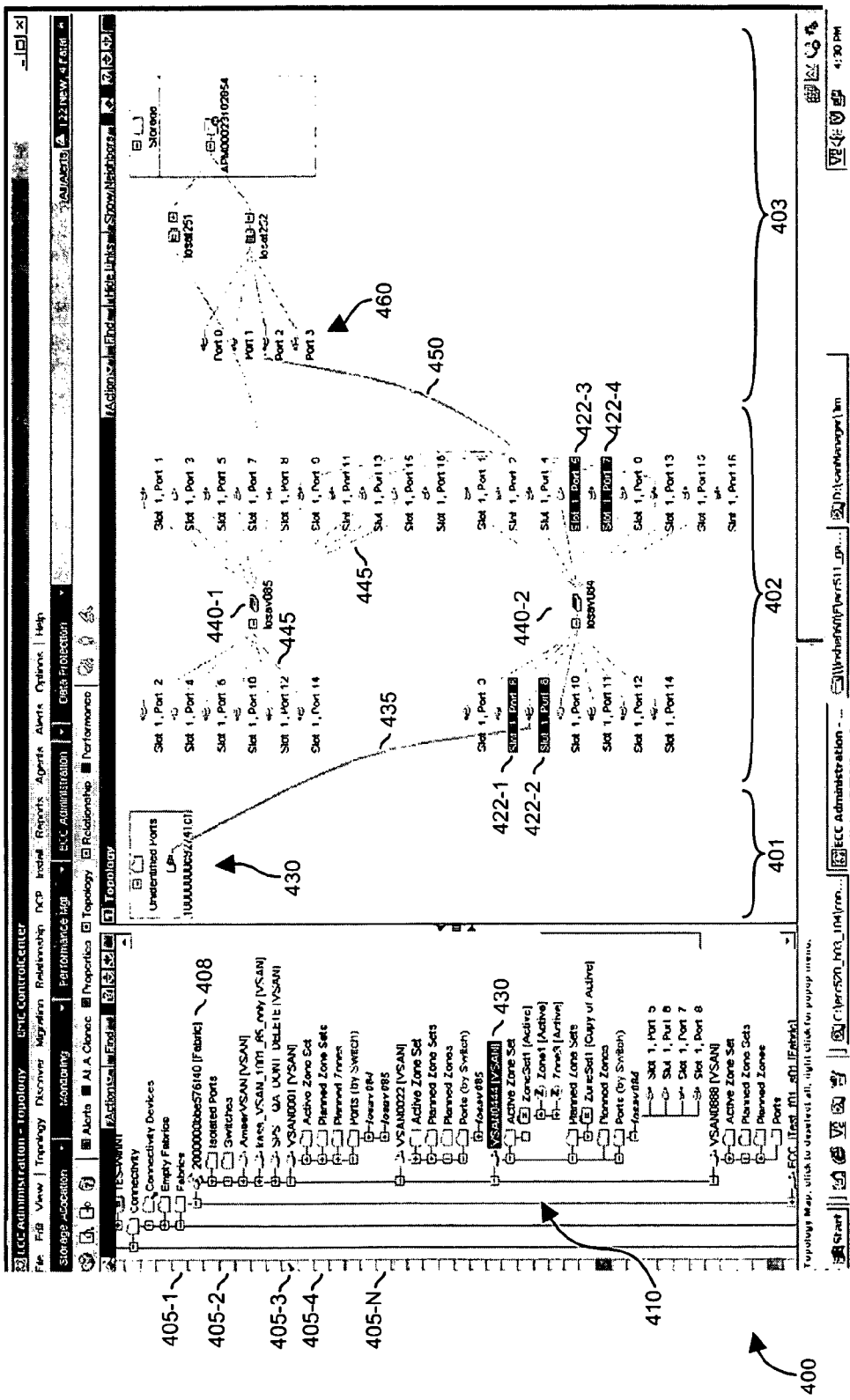
FIG. 4 is a screenshot of a graphical user interface according to an embodiment of the invention.

FIG. 4 is a screenshot 400 of display 130 according to an embodiment of the invention. As shown, display region 160 of screenshot 400 includes hierarchy of icons 410 representing managed objects (e.g., hardware and/or software resources) associated with storage area network 300. User 108 clicks on corresponding icons to expand or minimize different folders.

Display region 160 also includes display regions 405 (e.g., display region 405-1, 405-2, 405-3, 405-4, . . . 405-n), which may be toggled (e.g., via user 108 clicking on them) to identify network resources selected by user 108. As shown, user 108 clicks on display region 405-3 to select VSAN0001 which resides in a switch fabric (2000000bbe576140 [Fabric]) identified by switch fabric icon 408.

In response to user selection of VSAN0001 in hierarchy of icons 410, resource manager 120 displays a physical network topology of host resources 301, switch resources 302, and storage resources 303 associated with storage area network 300 in display region 170. For example, resource manager 120 displays icons representing host resources 301 in host resource display region 401, switch resources 302 in switch resource display region 402, and storage resources 303 in storage resource display region 403. These different network resources were discussed in relation to FIGS. 1-4.

In addition to displaying the network resources in display region 170, resource manager 120 identifies respective paths 435, 445, 450, etc. (e.g., of communication cables) to illustrate a connection relationship (e.g., physical network topology) associated with the network resources in storage area network 300. As discussed, resource manager 120 extracts information from managed objects 210 in database 125 to identify the relationship associated with a selected network resource.

To view a particular network resource such as a VSAN in display region 170 overlayed on a displayed physical network topology, user 108 clicks on one or more icons in hierarchy of icons 160. As shown, user 108 clicks on VSAN0444 (icon 420) in hierarchy of icons 410. In response to detecting this selection, resource manager 120 highlights (e.g., shades, marks, visually distinguishes, etc.) the selected icon 420 to indicate that it has been has been selected for viewing in display region 170.

In response to the selection, resource manager 120 highlights portions of the physical network topology in display region 170 associated with the selected icon 420 (i.e., VSAN0444). For example, resource manager 120 distinguishes or identifies ports 422 (namely, slot 1/port 6, slot 1/port 8, slot 1/port 5, slot 1/prot 7) of switch device 440-2 in the physical network topology as the particular network resources associated with selected VSASN0444. Consequently, user 108 can identify which ports of a switch resource are assigned to a particular VSAN.

In one embodiment, resource manager 120 enables a user 108 to select and view a virtual network topology including multiple VSANs. In other words, user 108 can select multiple VSANs for viewing at the same time. In this instance, resource manager 120 utilizes different color shadings to identify which network resources are associated with each selected VSAN. For example, as discussed, resources manager 120 shades selected icons (e.g, VSAN0444) and corresponding ports 422 with a first highlight type so that user 108 can identify ports 422 identified in switch resource display region 402 associated with a corresponding selected VSAN in hierarchy of icons 410. When user 108 additionally clicks on VSAN0001 (in addition to VSAN0444), this newly selected icon as well as corresponding highlighted ports in switch resource display region 402 associated with VSAN0001 would be shaded with a different highlight type.

Figure 5:
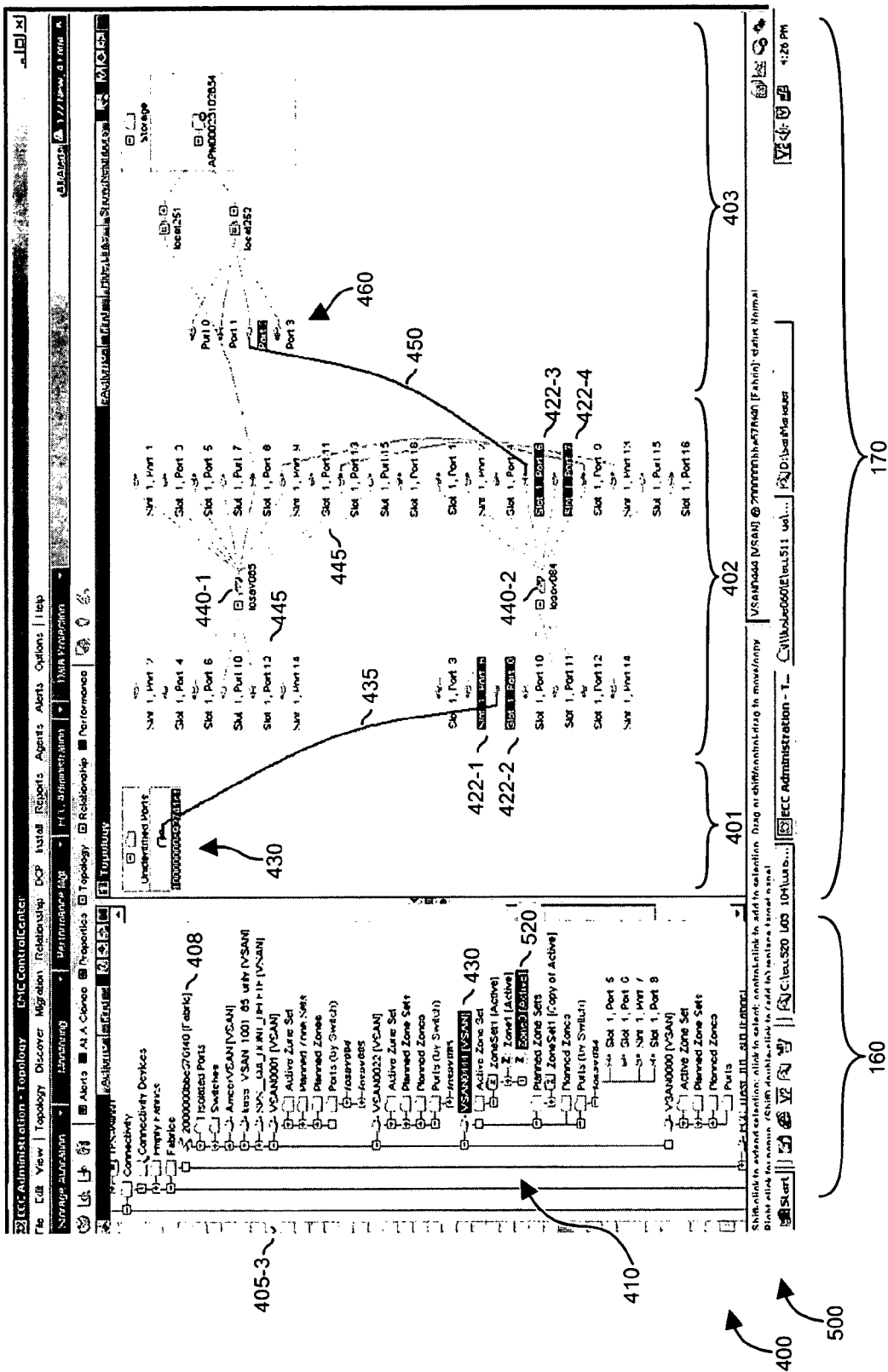
FIG. 5 is a screenshot of a graphical user interface according to an embodiment of the invention.

FIG. 5 is a screenshot 500 illustrating a display of additional configuration information in furtherance of the selection for viewing VSAN0444 made in FIG. 4 according to an embodiment of the invention. As shown, resource manager 120 receives a selection of another icon in hierarchy of icons 410. In particular, user 108 selects icon 520 (i.e., Zone3) in hierarchy of icons 410 for viewing additional network resources associated with display region 170. Icon 520 is displayed as a selectable folder associated with VSAN0444.

Selection of icon 520 prompts resource manager 120 to display additional network resources associated with already selected and displayed VSAN0444. For example, resource manager 120 can display additional network resources associated with VSAN0444 extending outward from switch resource display region towards host resources (in host resource display region 401) and storage resources (in storage resource display region 403). More specifically, based on selection of icon 520, resource manager 120 highlights respective paths 435 and 450 as well as corresponding port 430 and port 460 on display 130 to identify the additional network resources associated with VSAN0444. Port 430 (i.e., port 10000000c92471c1) identifies a host resource port coupled to slot 1, port 8 of switch device 440-2 via path 435. Port 460 (i.e., port 2) identifies a storage resource port coupled to slot 1, port 5 of switch device 440-2 via path 450. Shading of port 430 and port 460 with the same color as ports 422 makes it easy for user 108 to identify the association of newly displayed network resources with respect to network resources associated with VSAN0444.

In one embodiment, display region 170 includes yet additional configuration information identifying network resources extending from a host entity 304 to a corresponding physical storage device 380. For example, additional network resources that may be displayed and viewed on display 130 are shown in the previous figures. Thus, one embodiment of the invention enables a user to display not only one or more VSANs, but also any host resources (e.g., host entity 304, adapter 315, ports 320, etc.) and storage resources (e.g., ports 354, adapter 360, storage devices 365, physical storage devices 380, etc.) associated with the one or more VSANs.

General functionality supported by computer system 110 according to embodiments of the invention will now be discussed with respect to flowchart 600 in FIG. 6 as briefly discussed above with respect to FIGS. 1 through 5.

Figure 6:
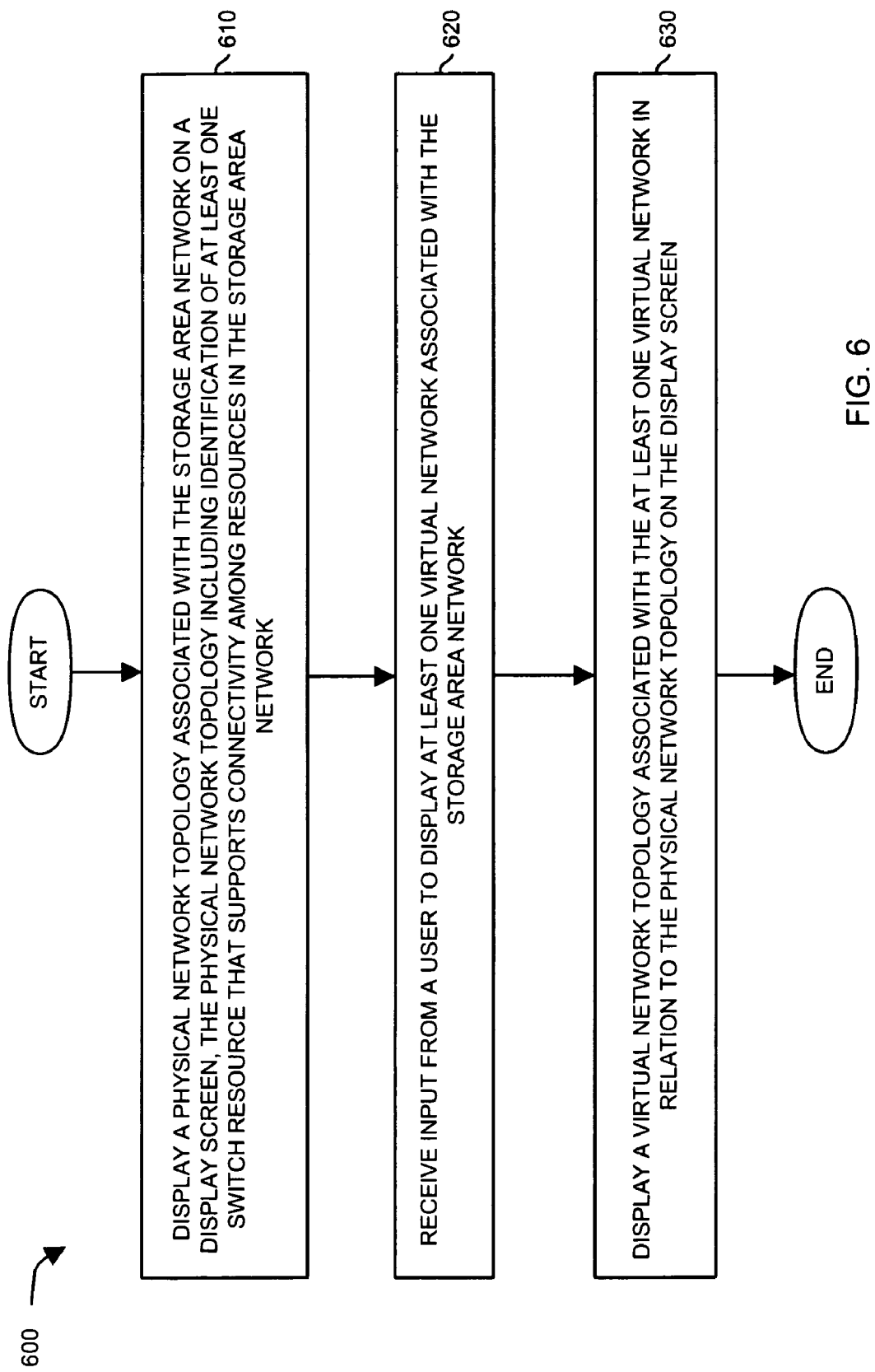
FIG. 6 is a flowchart illustrating a general technique for managing network resources according to an embodiment of the invention.

FIG. 6 is a flowchart 600 of processing steps performed by resource manager 120 according to an embodiment of the invention. In general, flowchart 600 illustrates how resource manager 120 enables user 108 of the management station computer system 110 to display management views associated with selected managed entities of storage area network 300. For example, one embodiment of the invention includes a technique of utilizing resource manager 120 to display a virtual network topology over a physical network topology associated with storage area network 300. Note that the discussion of FIG. 6 will includes occasional references to techniques and features discussed in the previous figures.

In step 610, resource manager 120 displays a physical network topology associated with storage area network 300. The physical network topology generated by the resource manager 120 includes identification of at least one switch resource 302 that supports connectivity among resources in a corresponding storage area network. As mentioned, switch resources are displayed in switch resource display region 402.

In step 620, the resource manager 120 receives input from a user 108 to display at least one virtual network (e.g., VSAN044) associated with the storage area network 300.

In step 630, in response to receiving the input from user 108, the resource manager 120 displayed a virtual network topology associated with the selected at least one virtual network in relation to the physical network topology on the display screen 130. Displaying the virtual network topology in relation to the physically network topology of the storage area network 300 enables a network manager to identify network resources in physical fabric associated with a selected virtual storage area network.

Note that the previous steps 610, 620, and 630 need not occur in the specific order as discussed. For example, in one embodiment, resource manager 120 receives a selection of a particular VSAN and, in response, displays a virtual network topology overlayed on a physical network topology.

FIG. 7 is a flowchart 700 of processing steps performed by resource manager 120 according to an embodiment of the invention. Flowchart 700 more particularly illustrates a technique of displaying configuration information (similar to that discussed in FIG. 6) associated with a VSAN according to an embodiment of the invention.

In step 710, resource manager 120 receives a signal indicating selection of one or more managed resources associated with the storage area network 300. For example, the processing device receives a signal (initiated by a user) identifying a selected one or more virtual storage area network for viewing on a display screen. In response to receiving the signal, the resource manager 120 extracts configuration information from database 125 to identify an overall physical network topology associated with the storage area network 300. Additionally, the resource manager 120 extracts configuration information from the database 125 to identify network resources associated with the one or more virtual storage area networks selected by a user 108 for display 130.

In step 715, based on the configuration information extracted from the database 125, the resource manager 120 displays the selected one or more virtual network topology associated with the selected at least one managed resource in relation to the physical network topology on display 130.

In substep 720, the resource manager 120 overlays the virtual network topology (including the one or more VSANs selected by a user) on the displayed physical network topology. Overlaying the virtual network topology in relation to the physically network topology of the storage area network 300 enables a network manager to identify a subset of network resources in the storage area network 300 associated with the one or more VSANs selected for viewing on display 130.

Presentation of information associated with the virtual storage area network topology (e.g., including one or more VSANs) varies depending on the application. As an example, in substep 725, the resource manager 120 displays port identification information (e.g., slot and port numbers of a corresponding switch device supporting the VSANs) in relation to corresponding icons representing switch ports on display 130. Thus, the resource manager 120 displays information to identify which communication ports of a switch resource 302 are associated with corresponding VSANs displayed in the virtual storage area network topology.

In substep 730, to identify network resources associated with the virtual storage area network topology, the resource manager 120 highlights (e.g., underlines, shades, marks, etc.) which uniquely identified switch ports of the at least one switch resource belong to a particular VSAN. Different colors or markings may be used to distinguish elements of two or more VSANs simultaneously displayed in the virtual network topology overlayed on the physical network topology. For example, network resources associated with a first VSAN may be shaded with a first color while network resources associated with a second VSAN may be shaded with a second color.

In substep 735, resource manager 120 highlights portions of the physical network topology to identify at least partial paths between host resources 301 (e.g, ports, adapters, hosts, clients, etc., associated with a host computer) and storage resources 303 (e.g., ports, adapters, storage devices, storage array, etc.) associated with the displayed VSANs of the storage area network. Thus, user 108 can identify which network resources (e.g., clients, target storage devices, etc.), in addition to those in a switch device, are associated with a particular selected VSAN.

Figure 8A:
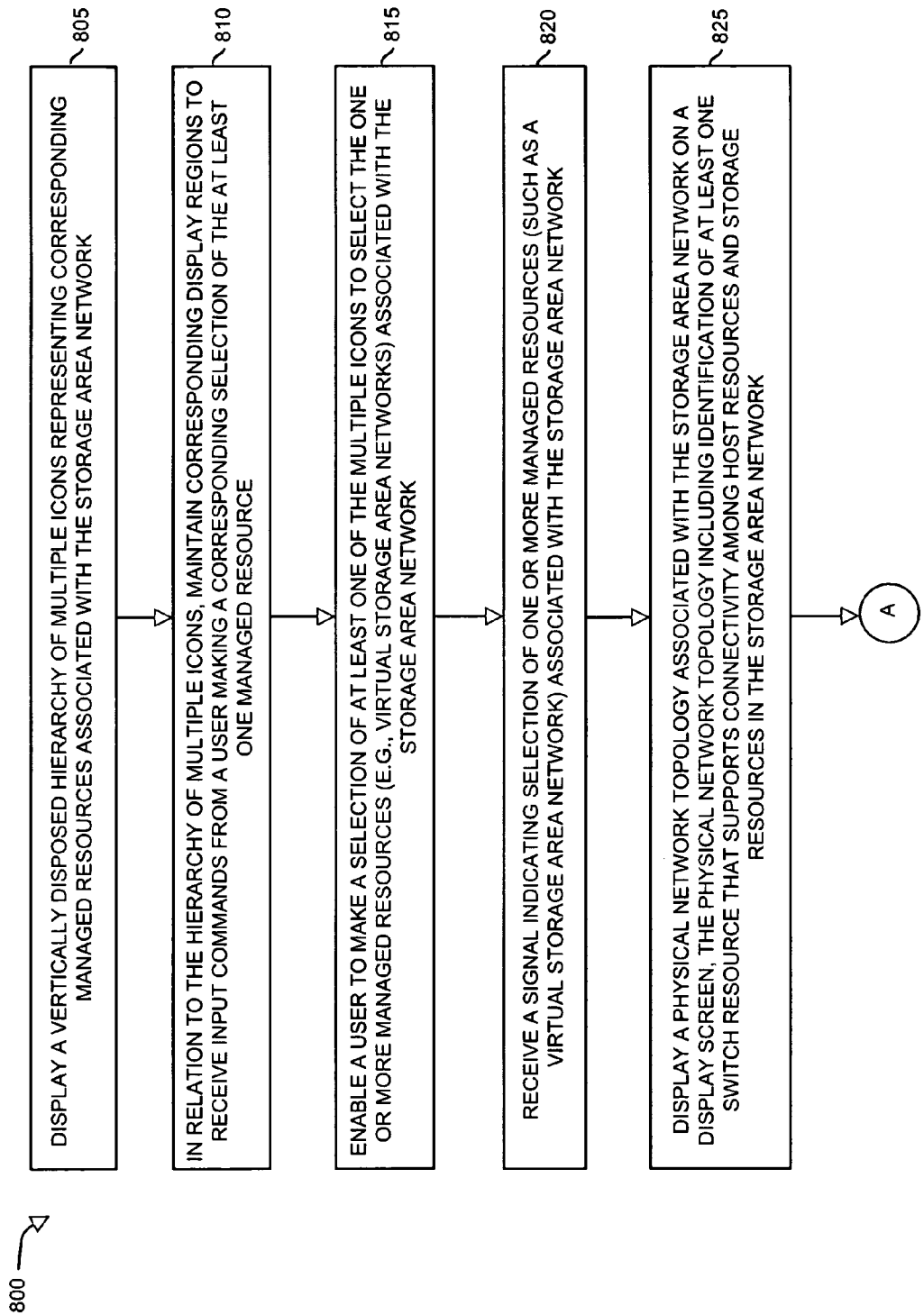

FIGS. 8A and 8B combine to form flowchart 800 illustrating processing steps performed by resource manager 120 in accordance with a more specific example embodiment of the invention. As discussed, resource manager 120 enables user 108 of the management station computer system 110 to select and view network resources associated with storage area network 300. Note that flowchart 800 may overlap with respect to other flowcharts discussed herein. Also, note that the steps in any of the flowcharts need not be performed in the order shown.

In step 805, resource manager 805 displays a vertically disposed hierarchy of icons 410 representing corresponding managed resources associated with the storage area network 300.

In step 810, in relation to the hierarchy of multiple icons 410, the resource manager 410 maintains corresponding display regions (e.g., display regions 405) to receive input commands from a user 108 making a corresponding selection of one or more managed network resource.

In step 815, resource manager 120 enables a user 108 to make a selection of at least one of the multiple icons to select the one or more managed resources (e.g., virtual storage area networks) associated with the storage area network 300.

In step 820, resource manager 108 receives a signal that the user 108 has initiated activation of the selection by clicking on an icon of the display screen. For example, user 108 clicks on display region 405. In turn, resource manager 120 receives a corresponding signal indicating selection of one or more managed resources (such as a virtual storage area network) associated with the storage area network 300.

In step 825, in response to the selected one or more managed resource, the resource manager 120 displays a physical network topology associated with the storage area network 300 on display 130. The physical network topology includes identification of at least one switch resource 302 that supports connectivity among host resources 301 and storage resources 303 in the storage area network 300.

In step 830, in addition to displaying the physical network topology, the resource manager 120 displays (e.g., overlays) a virtual network topology associated with the selected at least one managed resource in relation to the physical network topology.

In step 835, the resource manager 120 receives a signal identifying a selected zone associated with a displayed VSAN. For example, a user 108 may select a zone associated with a displayed VSAN from the hierarchy of icons 410.

In step 840, in response to a user's selection of a particular zone, the resource manager 120 receives a signal identifying a selected zone associated with the virtual storage area network. In response to receiving the signal identifying selection of the zone, the resource manager displays at least one host resource 301 and at least one storage resource 303 associated with the selected zone in relation to the virtual storage area network on display 130.

As discussed, techniques of the invention are well suited for use in applications in which a network manager manages a storage area network including one or more VSANs. However, it should be noted that embodiments of the invention are not limited to use in such applications and thus embodiments of the invention are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method for providing management information associated with a storage area network, the method comprising steps of:

displaying a physical network topology associated with the storage area network on a display screen, the physical network topology including identification of at least one switch resource that supports connectivity among host resources and storage resources in the storage area network;

receiving a signal indicating a selected at least one managed resource associated with the storage area network; and displaying a virtual network topology associated with the selected at least one managed resource in relation to the physical network topology;

displaying an expandable folder in a hierarchical tree, the hierarchical tree including resources present in the storage area network;

displaying multiple selectable symbols in the expandable folder, each of the multiple selectable symbols in the folder representing corresponding zones in the storage area network;

receiving selection of a given selectable symbol in the folder;

in response to receiving the selection of the given selectable symbol, overlaying a selected zone, as represented by the given selectable symbol, on the physical, network topology;

wherein overlaying the selected zone on the physical, network topology includes: highlighting which portions of the physical network topology represent the selected zone;

utilizing distinctive markings in the hierarchical tree to indicate the selected zone in the folder; and wherein highlighting which portions of the physical network topology represent the selected zone, includes: utilizing distinctive markings in the physical network topology to indicate which portions of the physical network topology represent the selected zone from the folder;

for each additional zone selected from the folder:

utilizing distinctive markings in the physical network topology to indicate each additionally selected zone;

utilizing distinctive markings in the physical network topology to indicate which portions of the physical network topology, represent each additionally selected zone in the folder; and the distinctive markings in the folder and the distinctive markings in the physical network topology enabling a viewer to identify which portions of the physical network topology correspond to different selected zones in the folder.

2. A method as in claim 1, wherein displaying the virtual network topology includes:

overlaying the virtual network topology associated with the selected at least one managed resource on the displayed physical network topology, the method further comprising:

displaying port identification information in relation to corresponding ports in the at least one switch resource to identify which ports of the at least one switch resource are associated with the virtual network topology.

3. A method as in claim 2, wherein the steps of receiving, displaying and overlaying are executed by a resource manager application of the storage area network, the resource manager application enabling a network manager to select and view at least one virtual storage area network as a portion of the physical network topology; and wherein displaying port identification information includes highlighting which ports of the at least one switch source belong to the virtual network topology.

4. A method as in claim 1, wherein receiving a signal indicating a selected at least one managed resource associated with the storage area network includes receiving a selection associated with a first virtual storage area network and a second virtual storage area network; and wherein displaying the virtual network topology includes:

simultaneously displaying, on the display screen, representations of i) the first virtual storage area network associated with a first selected managed resource, and ii) the second virtual storage area network associated with a second selected managed resource;

the first virtual storage area network and the second storage area network being uniquely illustrated as portions of the physical network topology displayed on the display screen.

5. A method as in claim 4 further comprising:

highlighting portions of the physical network topology with a first color to identify network resources associated with the first storage area network; and highlighting portions of the physical network topology with a second color to identify network resources associated with the second storage area network.

6. A method as in claim 1, wherein displaying the virtual network topology includes:

displaying a virtual storage area network associated with the at least one selected managed resource on the display screen; and highlighting portions of the physical network topology to identify at least partial paths between host resources and storage resources associated with the virtual storage area network.

7. A method as in claim 1 further comprising:

in a first region of the display screen, displaying multiple icons representing corresponding managed resources associated with the storage area network; and in relation to the multiple icons, maintaining corresponding display regions to receive input commands from a user making a corresponding selection of the at least one managed resource.

8. A method as in claim 1, wherein receiving the signal indicating the selected at least one managed resource includes receiving a first signal identifying a virtual storage area network associated with the storage area network; and wherein displaying the virtual network topology includes displaying specific ports and corresponding identifications of the specific ports of the at least one switch resource associated with the virtual storage area network.

9. A method as in claim 8 further comprising:

receiving a second signal identifying a selected zone associated with the virtual storage area network; and in response to receiving the second signal, displaying at least one host resource and at least one storage resource associated with the selected zone in relation to the virtual storage area network on the display screen.

10. A method as in claim 9 further comprising:

on the display screen, highlighting connection paths between the at least one host resource and the at least one switch resource as well as between the at least one switch resource and the at least one storage resource to identify network resources associated with the selected zone.

11. A method as in claim 10, wherein displaying the at least one host resource and the at least one storage resource associated with the selected zone includes:

displaying an identification of host resource ports associated with the at least one host resource that physically couple to corresponding switch resource ports of the at least one switch resource; and displaying an identification of storage resource ports of the at least one storage resource that physically coupled to corresponding switch resource ports of the at least one switch resource.

12. A method as in claim 11 further comprising;
displaying multiple icons representing corresponding selectable managed resources associated with the storage area network, at least one of the selectable managed resources representing a virtual network topology that may be selected for viewing in a second region of the display screen; and
displaying the virtual storage area network topology based on a selection of at least one of the multiple icons, the virtual storage area network i) being overlayed on the physical network topology, and ii) including identified ports of the at least one switch resource that are associated with a corresponding virtual storage area network.

13. A method for displaying management information associated with a storage area network on a display screen, the method comprising;
in a first region of the display screen:
displaying multiple icons representing corresponding selectable managed entities associated with the storage area network, at least one of the selectable managed entities representing a virtual network topology that may be selected for viewing in a second region of the display screen; in the second region of the display screen:
displaying a physical network topology associated with the storage area network, the physical network topology including at least one switch resource that supports connectivity among host resources and storage resources in the storage area network; and
displaying the virtual storage area network topology based on a selection of at least one of the multiple icons, the virtual storage area network i) being overlayed on the physical network topology, and ii) including identified ports of the at least one switch resource that are associated with a corresponding virtual storage area network
displaying an expandable folder in a hierarchical tree, the hierarchical tree including resources present in the storage area network;
displaying multiple selectable symbols in the expandable folder, each of the multiple selectable symbols in the folder representing corresponding zones in the storage area network;
receiving selection of a given selectable symbol in the folder; in response to receiving the selection of the given selectable symbol, overlaying a selected zone, as represented by the given selectable symbol, on the physical network topology;
wherein overlaying the selected zone on the physical network topology includes: highlighting which portions of the physical network topology represent the selected zone;
utilizing distinctive markings in the hierarchical tree to indicate the selected zone in the folder;
and wherein highlighting which portions of the physical network topology represent the selected zone includes: utilizing distinctive markings in the physical network topology to indicate which, portions of the physical network topology represent the selected zone from the folder for each additional zone selected from the folder:
utilizing distinctive markings in the physical network topology to indicate each additionally selected zone;
utilizing distinctive markings in the physical network topology to indicate which portions of the physical network topology represent, each additionally selected zone in the folder; and the distinctive markings in the folder and the distinctive markings in the physical network topology enabling a viewer to identify which portions of the physical network topology correspond to different selected zones in the folder.

14. A method as in claim 13, wherein displaying the virtual network topology includes:
simultaneously displaying i) a first virtual storage area network associated with a first selected managed entity, and ii) a second virtual storage area network associated with a second selected managed entity; and
the first virtual storage area network and the second storage area network being illustrated as portions of the physical network topology displayed on the display screen.

15. A method as in claim 14, wherein displaying the virtual network topology includes:
highlighting portions of the physical network topology to identify at least partial paths between host resources and storage resources associated with the first virtual storage area network and the second storage area network.

16. A method as in claim 13 further comprising:
displaying the first region on the display screen, the first region including a vertically disposed hierarchy of multiple icons representing corresponding selectable and expandable managed entities associated with the storage area network;
displaying the virtual network topology and physical network topology on the display screen, the virtual network topology including specific ports and corresponding identification information of the specific ports of the at least one switch resource associated with the virtual storage area network topology; and
highlighting the specific ports of the at least one switch resource to indicate that the specific ports are part of the virtual storage area network topology.

17. A method as in claim 13 further comprising:
displaying at least one host resource and at least one storage resource associated with the virtual storage area network topology on the display screen.

18. A method ad in claim 17 further comprising:
in the second region of the display screen, highlighting connection paths between the at least one host resource and the at least one switch resource as well as between the at least one switch resource and the at least one storage resource;
displaying an identification of host resource ports associated with the at least one host resource that physically couple to corresponding switch resource ports of the at least one switch resource; and
displaying an identification of storage resource ports of the at least one storage resource that physically couple to corresponding switch resource ports of the at least one switch resource.

19. A method for providing management information associated with a storage area network, the method comprising steps of:
displaying a physical network topology associated with the storage area network on a display screen, the physical network topology including identification of at least one switch resource that supports connectivity among resources in the storage area network;
receiving input from a user to display at least one virtual network associated with the storage area network; and
displaying a virtual network topology associated with the at least one virtual network in relation to the physical network topology on the display screen;

displaying an expandable folder in a hierarchical tree, the hierarchical tree including resources present in the storage area network; displaying multiple selectable symbols in the expandable folder, each of the multiple selectable symbols in the folder representing corresponding zones in the storage area network; receiving selection of a given selectable symbol in the folder; in response to receiving the selection of the given selectable, symbol, overlaying a selected zone, as represented by the given selectable symbol, on the physical network topology;

wherein overlaying the selected zone on the physical network topology includes: highlighting which portions of the physical network topology represent the selected zone;

utilizing distinctive markings in the hierarchical tree to indicate the selected zone in the folder;

and wherein highlighting which portions of the physical network topology represent the selected zone includes: utilizing distinctive markings in the physical network topology to indicate which portions of the physical network topology represent the selected zone from the folder;

for each additional zone selected from the folder;

utilizing distinctive markings in the physical network topology to indicate each additionally selected zone; utilizing distinctive markings in the physical network topology to indicate which portions of the physical network topology represent each additionally selected zone in the folder;

and the distinctive markings in the folder and the distinctive markings in the physical network topology enabling a viewer to identify which portions of the physical network topology correspond to different selected zones in the folder.

20. A method as in claim 19, wherein displaying the virtual network topology includes displaying specific ports and corresponding identifications of the specific ports of the at least one switch resource associated with the at least one virtual network.

21. A method as in claim 20 further comprising:
displaying at least one host resource and at least one storage resource associated with the at least one virtual network on the display screen.

22. A method as in claim 21 further comprising:
on the display screen, highlighting connection paths between the at least one host resource and the at least one switch resource as well as between the at least one switch resource and the at least one storage resource.

23. A method as in claim 22, wherein displaying the at least one host resource and the at least one storage resource includes:
displaying unique identification information of host resource ports associated with the at least one host resource that physically couple to corresponsing switch resource ports of the at least one switch resource; and
displaying unique identification information of storage resource ports of the at least one storage resource that physically couple to corresponding switch resource ports of the at least one switch resource.

24. A computer system for displaying management information associated with a storage area network, the computer system comprising:
a processor;
a memory unit that stores instructions associated with an application executed by the processor; and
an interconnect coupling the processor and the memory unit, enabling the computer system to execute the application and perform operations of: displaying a physical network topology associated with the storage area network on a display screen, the physical network topology including identification of at least one switch resource that supports connectivity among host resources and storage resources in the storage area network; receiving a signal indicating a selected at least one managed resource associated with the storage area network; and
displaying a virtual network topology associated with the selected at least one managed resource in relation to the physical network topology;
displaying an expandable folder in a hierarchical tree, the hierarchical tree including resources present in the storage area network;
displaying multiple selectable symbols in the expandable folder, each of the multiple selectable symbols in the folder representing corresponding zones in the storage area network;
receiving selection of a given selectable symbol in the folder; in response to receiving the selection of the given selectable symbol, overlaying a selected zone, as represented by the given selectable symbol, on the physical network topology; wherein overlaying the selected zone on the physical network topology includes: highlighting which portions of the physical network topology represent the selected zone;
utilizing distinctive markings in the hierarchical tree to indicate the selected zone in the folder;
and wherein highlighting which portions of the physical network topology represent the selected zone includes: utilizing distinctive markings in the physical network topology to indicate which portions of the physical network topology represent the selected zone from the folder;
for each additional zone selected from the folder:
utilizing distinctive markings in the physical network topology to indicate each additionally selected zone; utilizing distinctive markings in the physical network topology to indicate which portions of the physical network topology represent each additionally selected zone in the folder;
and the distinctive markings in the folder and the distinctive markings in the physical network topology enabling a viewer to identify which portions of the physical network topology correspond to different selected zones in the folder.

25. A computer system as in claim 24, wherein displaying the virtual network topology includes:
overlaying the virtual network topology associated with the selected at least one managed resource on the displayed physical network topology, the method further comprising:
displaying port identification information in relation to corresponding ports in the at least one switch resource to identify which ports of the at least one switch resource are associated with the virtual network topology.

26. A computer system as in claim 25, wherein displaying port identification information includes highlighting which ports of the at least one switch source belong to the virtual network topology.

27. A computer system as in claim 24, wherein receiving a signal indicating a selected at least one managed resource associated with the storage area networkd includes receiving a selection associated with a first storage area network and a second storage area network; and wherein displaying the virtual network topology includes:
simultaneously displaying, on the display screen, representations of i) the first virtual storage area network associated with a first selected managed resource, and ii) the second virtual storage area network associated with a second selected managed resource;
the first virtual storage area network and the second storage area network being uniquely illustrated as portions of the physical network topology displayed on the display screen.

28. A computer system as in claim 27 further supporting operations of:
highlighting portions of the physical network topology with a first color to identify network resources associated with the first storage area network; and
highlighting portions of the physical network topology with a second color to identify network resources associated with the second storage area network.

29. A computer system as in claim 24, wherein displaying the virtual network topology includes:
displaying a virtual storage area network associated with the at least one selected managed resource on the display screen; and
highlighting portions of the physical network topology to identify at least partial paths between host resources and storage resources associated with the virtual storage area network.

30. A computer system for displaying management information associated with a storage area network, the computer system comprising:
a processor;
a memory unit that stores instructions associated with an application executed by the processor;
and an interconnect coupling the processor and the memory unit, enabling the computer system to execute the application and perform operations of:
in a first region of the display screen:
displaying multiple icons representing corresponding selectable managed entities associated with the storage area network, at least one of the selectable managed entities representing a virtual network topology that may be selected for viewing in a second region of the display screen; in the second region of the display screen:
displaying a physical network topology associated with the storage area network, the physical network topology including at least one switch resource that supports connectivity among host resources and storage resources in the storage area network; and
displaying the virtual storage area network topology based on a selection of at least one of the multiple icons, the virtual storage area network i) being overlaying on the physical network topology, and ii) including identified ports of the at least one switch resource that are associated with a corresponding virtual storage area network;
displaying an expandable folder in a hierarchical tree, the hierarchical tree including resources present in the storage area network;
displaying multiple selectable symbols in the expandable folder, each of the multiple selectable symbols in the folder representing corresponding zones in the storage area network;
receiving selection of a given selectable symbol in the folder; in response to receiving the selection of the given selectable symbol, overlaying a selected zone, as represented by the given selectable symbol, on the physical network topology;
wherein overlaying the selected zone on the physical network topology includes: highlighting which portions of the physical network topology represent the selected zone;
utilizing distinctive markings in the hierarchical tree to indicate the selected zone in the folder;
and wherein highlighting which portions of the physical network topology represent the selected zone includes: utilizing distinctive markings in the physical network topology to indicate which portions of the physical network topology represent the selected zone from the folder;
for each additional zone selected from the folder;
utilizing distinctive markings in the physical network topology to indicate each additionally selected zone;
utilizing distinctive markings in the physical network topology to indicate which portions of the physical network topology represent each additionally selected zone in the folder;
and the distinctive markings in the folder and the distinctive markings in the physical network topology enabling a viewer to identify which portions of the physical network topology correspond to different selected zones in the folder.

31. A computer system as in claim 30, wherein displaying the virtual network topology includes:
simultaneously displaying i) a first virtual storage area network associated with a first selected managed entity, and ii) a second virtual storage area network associated with a second selected managed entity; and
the first virtual storage are network and the second storage area network being illustrated as portions of the physical network topology displayed on the display screen.

32. A computer system as in claim 31, wherein displaying the virtual network topology includes:
highlighting portions of the physical network topology to identify at least partial paths between host resources and storage resources associated with the first virtual storage area network and the second storage area network.

33. A computer program product including a computer-readable medium having instructions stored thereon for processing data information, such that the instructions, when carried out by a processing device, enable the processing device to perform the steps of:
displaying a physical network topology associated with the storage area network on a display screen, the physical network topology including identification of at least one switch resource that supports connectivity among resources in the storage area network;
receiving input from a user to display at least one virtual network associated with the storage area network; and
displaying a virtual network topology associated with the at least one virtual network in relation to the physical network topology on the display screen;
displaying an expandable folder in a hierarchical tree, the hierarchical tree including resources present in the storage area network;
displaying multiple selectable symbols in the expandable folder, each of the multiple selectable symbols in the folder representing corresponding zones in the storage area network;
receiving selection of a given selectable symbol in the folder; in response to receiving the selection of the given selectable symbol, overlaying a selected zone, as represented by the given selectable symbol, on the physical network topology;

wherein overlaying the selected zone on the physical network topology includes: highlighting which portions of the physical network topology represent the selected zone;

utilizing distinctive markings in the hierarchical tree to indicate the selected zone in the folder;

and wherein highlighting which portions of the physical network, topology represent the selected zone includes: utilizing distinctive markings in the physical network topology to indicate which portions of the physical network topology represent the selected zone from the folder;

for each additional zone selected from the folder:

utilizing distinctive markings in the physical network topology to indicate each additionally selected zone;

utilizing distinctive markings in the physical network topology to indicate which portions of the, physical network topology represent each additionally selected zone in the folder; and the distinctive markings in the folder and the distinctive markings in the physical network topology enabling a viewer to identify which portions of the physical network topology correspond to different selected zones in the folder.

34. A computer system associated with a storage area network, the computer system providing:

means for displaying a physical network topology associated with the storage area network on a display screen, the physical network topology including identification of at least one switch resource that supports connectivity among resources in the storage area network;

means for receiving input from a user to display at least one virtual network associated with the storage area network; and means for displaying a virtual network topology associated with the at least one virtual network in relation to the physical network topology on the display screen;

means for displaying an expandable folder in a hierarchical tree, the hierarchical tree including resources present in the storage area network;

means for displaying multiple selectable symbols in the expandable folder, each of the multiple selectable symbols in the folder representing corresponding zones in the storage area network;

means for receiving selection of a given selectable symbol in the folder; means for overlaying a selected zone, as represented by the given selectable symbol, on the physical network topology in response to receiving the selection of the given selectable symbol;

wherein overlaying the selected zone on the physical network topology includes: highlighting which portions of the physical network topology represent the selected zone;

means for utilizing distinctive markings in the hierarchical tree to indicate the selected zone in the folder; and wherein highlighting which portions of the physical network, topology represent the selected zone includes: utilizing distinctive markings in the physical network topology to indicate which portions of the physical network topology represent the selected zone from the folder;

for each additional zone selected from the folder:

means for utilizing distinctive markings in the physical network topology to indicate each additionally selected zone;

means for utilizing distinctive markings in the physical network topology to indicate which portions of the, physical network topology represents each additionally selected zone in the folder; and the distinctive markings in the folder and the distinctive markings in the physical network topology enabling a viewer to identify which portions of the physical network topology correspond to different selected zones in the folder.

35. A method of claim 1 further comprising:

in response to receiving selection of the given selectable symbol in the folder of the hierarchical tree, initiating expansion of the physical network topology to include additional network resources of the storage area network.

36. A method as in claim 1 further comprising:

displaying a symbol representing a zone of the storage area network; and in response to reeving selection of the symbol, marking the physical network topology to indicate ports of the at least one switch resource in the physical topology that make up the zone.

37. A method as in claim 36, wherein displaying the symbol includes:

in a separate region than the physical topology, displaying the symbol in a hierarchy of resources associated with the storage area network; and displaying the symbol to include text indicating a corresponding name of the zone.

* * * * *